US009557697B2

(12) United States Patent
Waida et al.

(10) Patent No.: US 9,557,697 B2
(45) Date of Patent: Jan. 31, 2017

(54) RECORDING MEDIA SMOOTHNESS DETECTOR AND IMAGE FORMING APPARATUS INCORPORATING SAME

(71) Applicants: Takumi Waida, Kanagawa (JP); Shuji Hirai, Tokyo (JP); Terumichi Ochi, Kanagawa (JP); Shinji Kato, Kanagawa (JP); Ryota Yamashina, Kanagawa (JP); Keitaro Shoji, Kanagawa (JP)

(72) Inventors: Takumi Waida, Kanagawa (JP); Shuji Hirai, Tokyo (JP); Terumichi Ochi, Kanagawa (JP); Shinji Kato, Kanagawa (JP); Ryota Yamashina, Kanagawa (JP); Keitaro Shoji, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/643,082

(22) Filed: Mar. 10, 2015

(65) Prior Publication Data

US 2015/0261161 A1 Sep. 17, 2015

(30) Foreign Application Priority Data

Mar. 17, 2014 (JP) ................................ 2014-053228
Jan. 9, 2015 (JP) ................................ 2015-003397

(51) Int. Cl.
*G01J 4/00* (2006.01)
*G03G 15/00* (2006.01)

(52) U.S. Cl.
CPC *G03G 15/5029* (2013.01); *G03G 2215/00616* (2013.01); *G03G 2215/00734* (2013.01)

(58) Field of Classification Search
CPC ................ G03G 21/02; G03G 15/5029; G03G 2215/00734; G03G 2215/00616
(Continued)

(56) References Cited

U.S. PATENT DOCUMENTS 5,403,445 A * 4/1995 Shimomura ........... G03G 7/006 162/147
5,974,276 A * 10/1999 Oogi .................. G03G 15/0266 399/43
(Continued)

FOREIGN PATENT DOCUMENTS

EP 0 623 894 A1 11/1994
JP 10-160687 6/1998
(Continued)

OTHER PUBLICATIONS

English translation of Kita et al. (JP2008-278215), Nov. 13, 2008.*
(Continued)

*Primary Examiner* — Kara E Geisel
*Assistant Examiner* — Dominic J Bologna
(74) *Attorney, Agent, or Firm* — Oblon, McClelland, Maier & Neustadt, L.L.P.

(57) ABSTRACT

A recording media smoothness detector includes a sensor and a calculator. The sensor includes a light source to emit light toward a recording medium and a light detector to detect an amount of light reflected by the recording medium. The calculator includes a first memory to store an initial output value of the sensor and a second memory to store a decreased output percentage of the sensor relative to the initial output value per number of recording media detected. The calculator is configured to calculate a decreased output amount of the sensor from the decreased output percentage of the sensor per number of recording media detected, according to a number of recording media detected by the sensor, to adjust a luminosity of the light source based on the calculated decreased output amount of the sensor and determine a type of the recording medium based on an output of the sensor after the adjustment of the luminosity of the light
(Continued)

source and based on the number of recording media detected by the sensor.

17 Claims, 12 Drawing Sheets

(58) Field of Classification Search
USPC .................................... 399/43; 356/445–448
See application file for complete search history.

(56) References Cited

U.S. PATENT DOCUMENTS

| | | | | |
|---|---|---|---|---|
| 6,327,453 | B1 * | 12/2001 | Imaizumi | G03G 15/0194 399/301 |
| 7,941,063 | B2 * | 5/2011 | Suzuki | G03G 15/657 399/43 |
| 2005/0201808 | A1 | 9/2005 | Barry et al. | |
| 2006/0165425 | A1 | 7/2006 | Matayoshi et al. | |
| 2008/0292369 | A1 * | 11/2008 | Takezawa | G03G 15/0131 399/301 |
| 2010/0310264 | A1 * | 12/2010 | Ishida | G03G 15/5029 399/45 |
| 2012/0087682 | A1 * | 4/2012 | Deguchi | G03G 15/2039 399/43 |
| 2012/0134693 | A1 | 5/2012 | Hoshi et al. | |
| 2013/0194573 | A1 | 8/2013 | Ohba et al. | |
| 2013/0308961 | A1 * | 11/2013 | Kim | G03G 15/086 399/10 |
| 2014/0270822 | A1 | 9/2014 | Yamashina et al. | |

FOREIGN PATENT DOCUMENTS

| | | |
|---|---|---|
| JP | 2002-340518 | 11/2002 |
| JP | 2006-062842 | 3/2006 |
| JP | 2008-278215 A | 11/2008 |
| JP | 2009-139415 | 6/2009 |
| JP | 2012-127937 | 7/2012 |
| JP | 2012-128393 | 7/2012 |
| JP | 2012-194445 | 10/2012 |
| JP | 2012-208103 | 10/2012 |

OTHER PUBLICATIONS

U.S. Appl. No. 14/470,096, filed Aug. 27, 2014.
U.S. Appl. No. 14/473,448, filed Aug. 29, 2014.
U.S. Appl. No. 14/474,939, filed Sep. 2, 2014.
U.S. Appl. No. 14/512,657, filed Oct. 13, 2014.
Extended European Search Report issued Jul. 17, 2015 in Patent Application No. 15157975.2.

* cited by examiner

RECORDING MEDIA SMOOTHNESS DETECTOR AND IMAGE FORMING APPARATUS INCORPORATING SAME

CROSS-REFERENCE TO RELATED APPLICATIONS

This patent application is based on and claims priority pursuant to 35 U.S.C. §119(a) to Japanese Patent Application Nos. 2014-053228, filed on Mar. 17, 2014, and 2015-003397, filed on Jan. 9, 2015, in the Japan Patent Office, the entire disclosure of each of which is hereby incorporated by reference herein.

BACKGROUND

Technical Field

Embodiments of the present invention generally relate to a recording media smoothness detector and an image forming apparatus incorporating the recording media smoothness detector.

Background Art

Various types of electrophotographic image forming apparatuses are known, including copiers, printers, facsimile machines, and multifunction machines having two or more of copying, printing, scanning, facsimile, plotter, and other capabilities. Such image forming apparatuses usually form an image on a recording medium according to image data. Specifically, in such image forming apparatuses, for example, a charger uniformly charges a surface of a photoconductor serving as an image carrier. An optical writer irradiates the surface of the photoconductor thus charged with a light beam to form an electrostatic latent image on the surface of the photoconductor according to the image data. A developing device supplies toner to the electrostatic latent image thus formed to render the electrostatic latent image visible as a toner image. The toner image is then transferred onto a recording medium directly, or indirectly via an intermediate transfer belt. Finally, a fixing device applies heat and pressure to the recording medium carrying the toner image to fix the toner image onto the recording medium.

Such image forming apparatuses may incorporate a recording media smoothness detector to detect smoothness of recording media.

SUMMARY

In one embodiment of the present invention, a novel recording media smoothness detector is described that includes a sensor and a calculator. The sensor includes a light source to emit light toward a recording medium and a light-detecting device to detect an amount of light reflected by the recording medium. The calculator includes a first memory to store an initial output value of the sensor and a second memory to store a decreased output percentage of the sensor relative to the initial output value per number of recording media detected. The calculator is configured to calculate a decreased output amount of the sensor from the decreased output percentage of the sensor per number of recording media detected, according to number of recording media detected by the sensor, to adjust a luminosity of the sensor based on the calculated decreased output amount of the sensor and determine smoothness of the recording medium based on an output of the sensor after the adjustment.

In another embodiment of the present invention, a novel recording media smoothness detector is described that includes a sensor and a calculator. The sensor includes a light source to emit light toward a recording medium and a light-detecting device to detect an amount of light reflected by the recording medium. The calculator includes a first memory to store an initial output value of the sensor and a second memory to store a decreased output percentage of the sensor relative to the initial output value per unit length of recording media. The calculator is configured to calculate a decreased output amount of the sensor from the decreased output percentage of the sensor per unit length of recording media, according to a unit length of recording media detected by the sensor, to adjust a luminosity of the sensor based on the calculated decreased output amount of the sensor and determine smoothness of the recording medium based on an output of the sensor after the adjustment.

Also described are image forming apparatuses incorporating the recording media smoothness detectors.

BRIEF DESCRIPTION OF THE DRAWINGS

A more complete appreciation of the disclosure and many of the attendant advantages thereof will be more readily obtained as the same becomes better understood by reference to the following detailed description of embodiments when considered in connection with the accompanying drawings, wherein.

Figure 1:
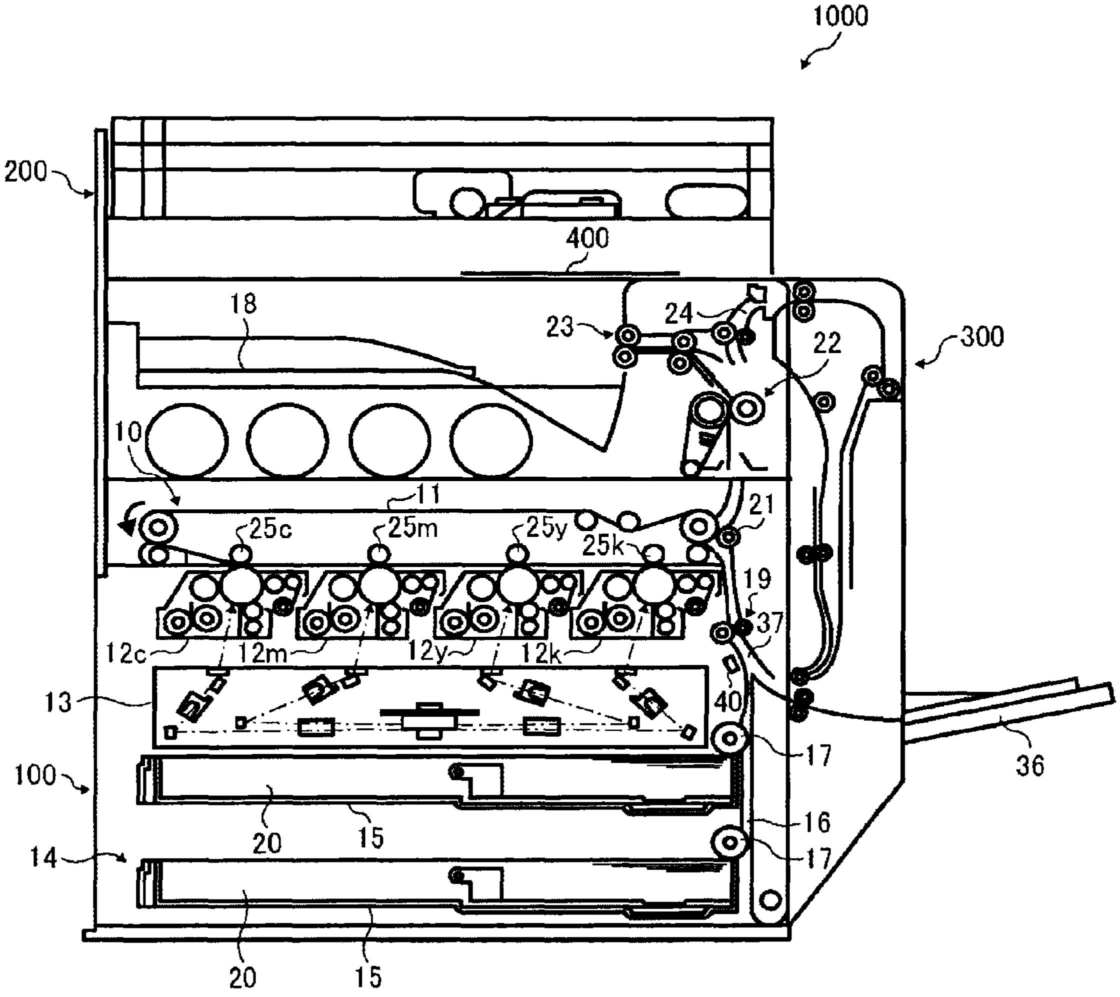
FIG. 1 is a schematic sectional view of an image forming apparatus according to an embodiment of the present invention.

The accompanying drawings are intended to depict embodiments of the present invention and should not be interpreted to limit the scope thereof.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the invention and not all of the components or elements described in the embodiments of the present invention are indispensable.

In a later-described comparative example, embodiment, and exemplary variation, for the sake of simplicity like reference numerals are given to identical or corresponding constituent elements such as parts and materials having the same functions, and redundant descriptions thereof are omitted unless otherwise required.

It is to be noted that, in the following description, suffixes “c”, “m”, “y”, and “k” denote colors cyan, magenta, yellow, and black, respectively. To simplify the description, these suffixes are omitted unless necessary.

Referring now to the drawings, wherein like reference numerals designate identical or corresponding parts throughout the several views, embodiments of the present invention are described below.

Initially with reference to FIG. 1, a description is given of a configuration of an image forming apparatus 1000 according to an embodiment of the present invention.

FIG. 1 is a schematic sectional view of the image forming apparatus 1000. In the present embodiment, the image forming apparatus 1000 is an electrophotographic image forming apparatus.

As illustrated in FIG. 1, the image forming apparatus 1000 includes, a body 100, an image reading device 200 positioned on the body 100, and a duplex unit 300 positioned on the right side of the body 100.

The body 100 includes an intermediate transfer device 10. The intermediate transfer device 10 includes an endless intermediate transfer belt 11 entrained around a plurality of rollers and stretched almost horizontally. The intermediate transfer belt 11 rotates in a counterclockwise direction in FIG. 1.

Image forming devices 12*c*, 12*m*, 12*y*, and 12*k* are arranged side by side parallel to and under the intermediate transfer belt 11 of the intermediate transfer device 10, in that order, in a direction in which the intermediate transfer belt 11 is rotated. The image forming devices 12*c*, 12*m*, 12*y*, and 12*k* form toner images of cyan, magenta, yellow, and black, respectively. Each of the image forming devices 12*c*, 12*m*, 12*y*, and 12*k* includes a drum-shaped image bearer rotated in a clockwise direction in FIG. 1 and various devices surrounding the image bearer, such as a charging device, a developing device, a transfer device, and a cleaning device. An exposure device 13 is disposed below the image forming devices 12*c*, 12*m*, 12*y*, and 12*k*.

A sheet feeder 14 is disposed below the exposure device 13. The sheet feeder 14 includes a plurality of trays 15, in this case two trays 15, each of which accommodates recording media 20. Sheet feeding rollers 17 are positioned above and to the right of the trays 15, respectively. Each of the sheet feeding rollers 17 picks up the recording media 20 one at a time from the corresponding tray 15 to feed the recording medium 20 thus picked up to a recording medium conveyance passage 16.

The recording medium conveyance passage 16 is disposed on the right inside the body 100 to convey the recording medium 20 perpendicularly upward to an internal ejection section 18 defined between the body 100 and the image reading device 200. A pair of conveyance rollers 19, a secondary transfer device 21 facing the intermediate transfer belt 11, a fixing device 22, and a pair of ejection rollers 23 are provided, in that order, along the recording medium conveyance passage 16, in a direction in which the recording medium 20 is conveyed. A sheet feeding passage 37 is located upstream from the pair of conveyance rollers 19 in the direction in which the recording medium 20 is conveyed. The sheet feeding passage 37 joins the recording medium conveyance passage 16 to feed the recording medium 20 coming from the duplex unit 300 or a recording medium 20 coming from a bypass tray 36 crossing the duplex unit 300, toward the pair of conveyance rollers 19. A re-feed conveyance passage 24, which is a branch conveyance passage to the duplex unit 300, is located downstream from the fixing device 22 in the direction in which the recording medium 20 is conveyed.

To provide a fuller understanding of embodiments of the present invention, a description is now given of an image forming operation of the image forming apparatus 1000.

The image reading device 200 reads a document image, and according to the image data, the exposure device 13 irradiates the surfaces of the image bearers of the image forming devices 12 with light to form latent images thereon. The developing devices develop the latent images into visible toner images. Primary transfer devices 25*c*, 25*m*, 25*y*, and 25*k* sequentially transfer the toner images of cyan, magenta, yellow and black, respectively, onto the intermediate transfer belt 11 so that the toner images are superimposed one atop another on the intermediate transfer belt 11. Thus, a color toner image is formed on the intermediate transfer belt 11.

In the meantime, one of the sheet feeding rollers 17 is selectively rotated to pick up a recording medium 20 from the corresponding tray 15 to convey the recording medium 20 to the recording medium conveyance passage 16. Alternatively, a recording medium 20 is sent from the bypass tray 36 to the recording medium conveyance passage 16 through the sheet feeding passage 37. The pair of conveyance rollers 19 receives the recording medium 20 thus conveyed, and feeds the recording medium 20 to a secondary transfer position between the intermediate transfer belt 11 and the secondary transfer device 21 at a predetermined time, so that the secondary transfer device 21 transfers the color toner image onto the recording medium 20 from the intermediate transfer belt 11 at the secondary transfer position. The recording medium 20 bearing the color toner image is then conveyed to the fixing device 22, which fixes the color toner image onto the recording medium 20. Then, the recording medium 20 is conveyed from the fixing device 22 to the pair of ejection rollers 23, which ejects the recording medium 20 to the internal ejection section 18.

Upon duplex printing, the recording medium 20 is conveyed to the duplex unit 300 through the re-feed conveyance passage 24 after an image is formed on a front side of the recording medium 20. In the duplex unit 300, the recording medium 20 is turned over and conveyed to the pair of registration rollers 19 through the sheet feeding passage 37. The pair of registration rollers 19 feeds the recording medium 20 toward the secondary transfer position where another color toner image is transferred onto a back side of the recording medium 20 from on the intermediate transfer belt 11. The recording medium 20 is then conveyed to the fixing device 22, which fixes the unfixed color toner image onto the back side of the recording medium 20. Then, the recording medium 20 is conveyed from the fixing device to the pair of ejection rollers 23, which ejects the recording medium 20 to the internal ejection section 18.

Usually, in image forming apparatuses, fixing conditions including heat and pressure are taken into account to appropriately fix the toner image onto the recording medium. In particular, such fixing conditions are determined specifically for each type of recording medium to form a high-quality image on the recording medium because the image quality is significantly influenced by such factors as the material, thickness, humidity, smoothness, and coating (if any) of the recording medium. The smoothness is, e.g., a surface smoothness of the recording medium, and can be ascertained by the time (in seconds) it takes for a certain amount of air to flow between the surface of the recording medium and a testing board adhering to the surface of the recording medium. The smoothness and fixability of recording medium are correlated because the fixing rate of toner in the recessed portions of the recording medium depends on the roughness thereof. Accordingly, if an image is fixed onto the recording medium under fixing conditions neglecting the smoothness, a high-quality image may not be obtained and, in some cases, fixing errors may occur, generating an unacceptable image on the recording medium.

Meanwhile, as image forming apparatuses have become more sophisticated and modes of expression have become more diverse, there are now hundreds of different types of recording media. Each type of recording media has a variety of brands with, e.g., different basis weights and thicknesses. Therefore, to form a high-quality image, fixing conditions are determined precisely according to, e.g., the types and brands of recording media.

There are increasing numbers of types of recording media, such as plain paper, coated paper such as gloss coated paper, mat coated paper, and art paper, overhead projector (OHP) sheets, and special paper that is embossed.

In the image forming apparatuses, generally, the fixing conditions are determined according to the basis weight of the recording medium by which the recording medium is classified. For example, paper having a basis weight of about 60 $g/m^2$ to about 90 $g/m^2$ is classified as plain paper. Paper having a basis weight of about 91 $g/m^2$ to about 105 $g/m^2$ is classified as medium thick paper. Paper having a basis weight of about 106 $g/m^2$ to about 200 $g/m^2$ is classified as thick paper. The fixing temperature, the conveying speed of the recording medium, and the like are determined according to these classifications.

Generally, the basis weight of recording media is listed on the package so that the basis weight is easily ascertained. The basis weight information is selected on an operation panel of a copier or on a printer driver displayed on a printer.

Thus, generally, the basis weight is set manually, which may be troublesome. In addition, if the wrong basis weight is set, an intended high-quality image may not be obtained.

Accordingly, some image forming apparatuses incorporate a sensor to detect the thickness of recording media to automatically sort the recording media to form images thereon.

On the other hand, the smoothness of recording media is not usually listed on the package, which makes it difficult to ascertain. For this reason, a sensor may be used to obtain the smoothness of recording media, since, as described above, smoothness and fixability are correlated.

The image forming apparatus 1000 includes a smoothness sensor 40 (hereinafter simply referred to as a sensor 40) constituting a recording media smoothness detector 1 that detects smoothness of the recording medium 20. The sensor 40 is provided on a conveyance passage through which the recording medium 20 is conveyed.

Figure 2:
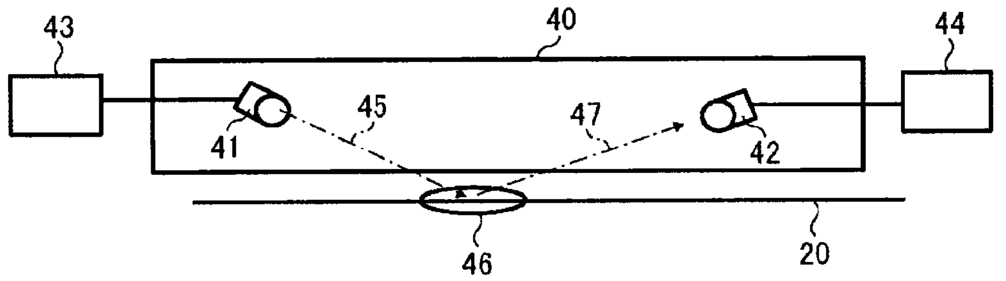
FIG. 2 is a schematic sectional view of a sensor incorporated in the image forming apparatus.

FIG. 2 is a schematic view of the sensor 40. As illustrated in FIG. 2, the sensor 40 includes a light-emitting device 41 serving as a light source and a light-receiving device 42 serving as a light-detecting device. The light-emitting device 41 emits light 45 toward the recording medium 20. The light 45 is reflected by the recording medium 20 in a first reflection region 46, becoming reflected light 47 that is received by the light-receiving device 42. The light-emitting device 41 is a laser or a light-emitting diode (LED) provided with a drive source 43 for emitting light. The light-receiving device 42 is, e.g., a photodiode or a phototransistor, provided with a detecting circuit 44 that amplifies a detected current and converts the detected current from analog to digital data. The light reflected by the recording medium 20 includes regular reflection light and scattering light. By providing a plurality of light-emitting devices 41 and drive sources 43 or a plurality of light-receiving devices 42 and detecting circuits 44, the scattering light can be used for detection of surface nature. It is to be noted that, in FIG. 2, the recording medium 20 is conveyed in a horizontal direction or to the back of the sheet face. In addition, a condenser lens is provided on an optical axis.

Figure 3:
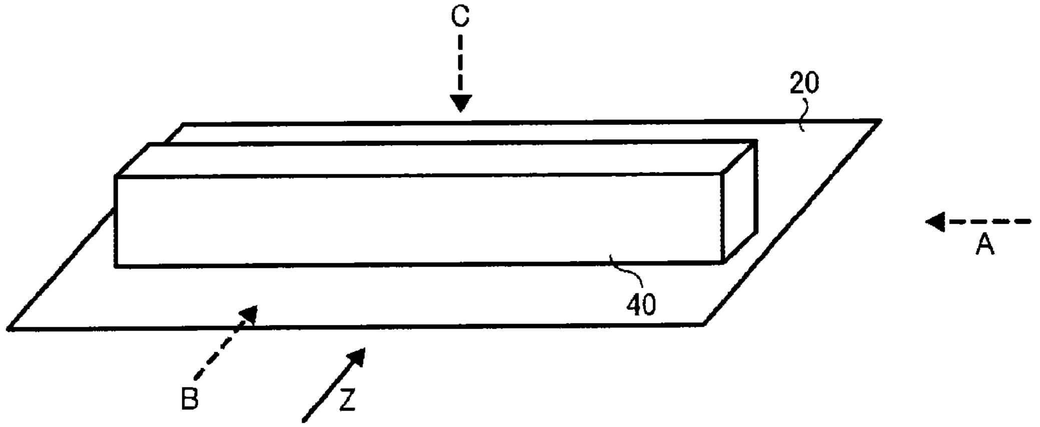
FIG. 3 is a diagram illustrating relative positions of the sensor and a recording medium.

FIG. 3 is a diagram illustrating relative positions of the sensor 40 and the recording medium 20. Specifically, the light-emitting device 41 and the light-receiving device 42 of the sensor 40 are disposed in a direction perpendicular to the recording medium 20 that is conveyed in a direction indicated by arrow Z, to the back of the sheet face. The following description is given with reference to the drawings viewed in a direction indicated by arrow A in FIG. 3.

Figure 4:
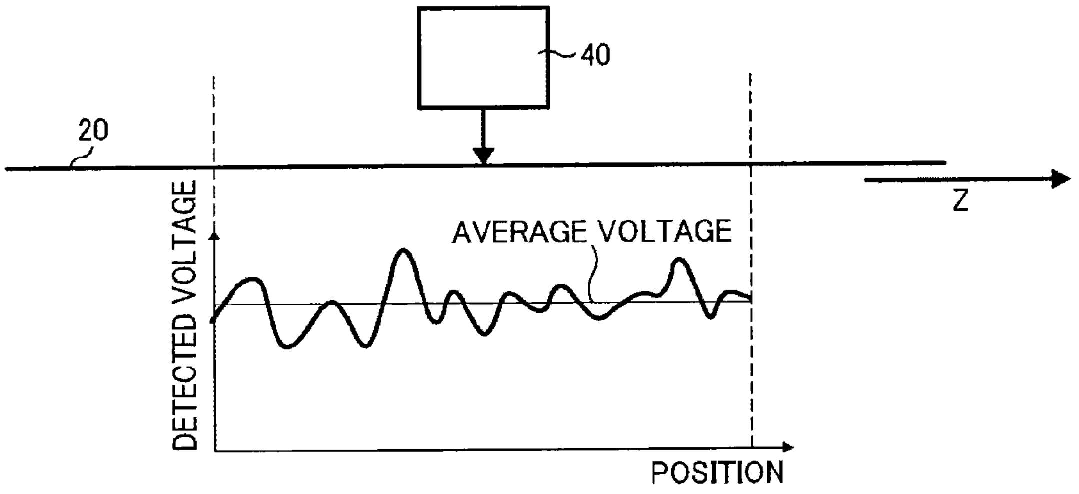
FIG. 4 is a view of the sensor and the recording medium, with voltage detected by the sensor for a prescribed distance.

FIG. 4 is a diagram of the sensor 40 and the recording medium 20, illustrating voltage detected by the sensor 40 for a prescribed distance. In FIG. 4, the sensor 40 and the recording medium 20 face each other.

In the present embodiment, the sensor 40 is disposed inside the image forming apparatus 1000 to scan a prescribed position or section on the recording medium 20 and equalize detected voltage. Specifically, the sensor 40 equalizes the detected voltage that fluctuates due to slight roughness in the surface of the recording medium 20, thereby obtaining an average smoothness of the recording medium 20.

To ensure a sufficient length of the prescribed section for accurate equalization of detected voltage, the prescribed section preferably has a length of at least about 40 mm. In addition, an appropriate trigger such as rotation of a registration motor that drives the pair of conveyance rollers 19 is used so that the sensor 40 detects one recording medium 20 at an appropriate time inside the image forming apparatus 1000.

Figure 5:
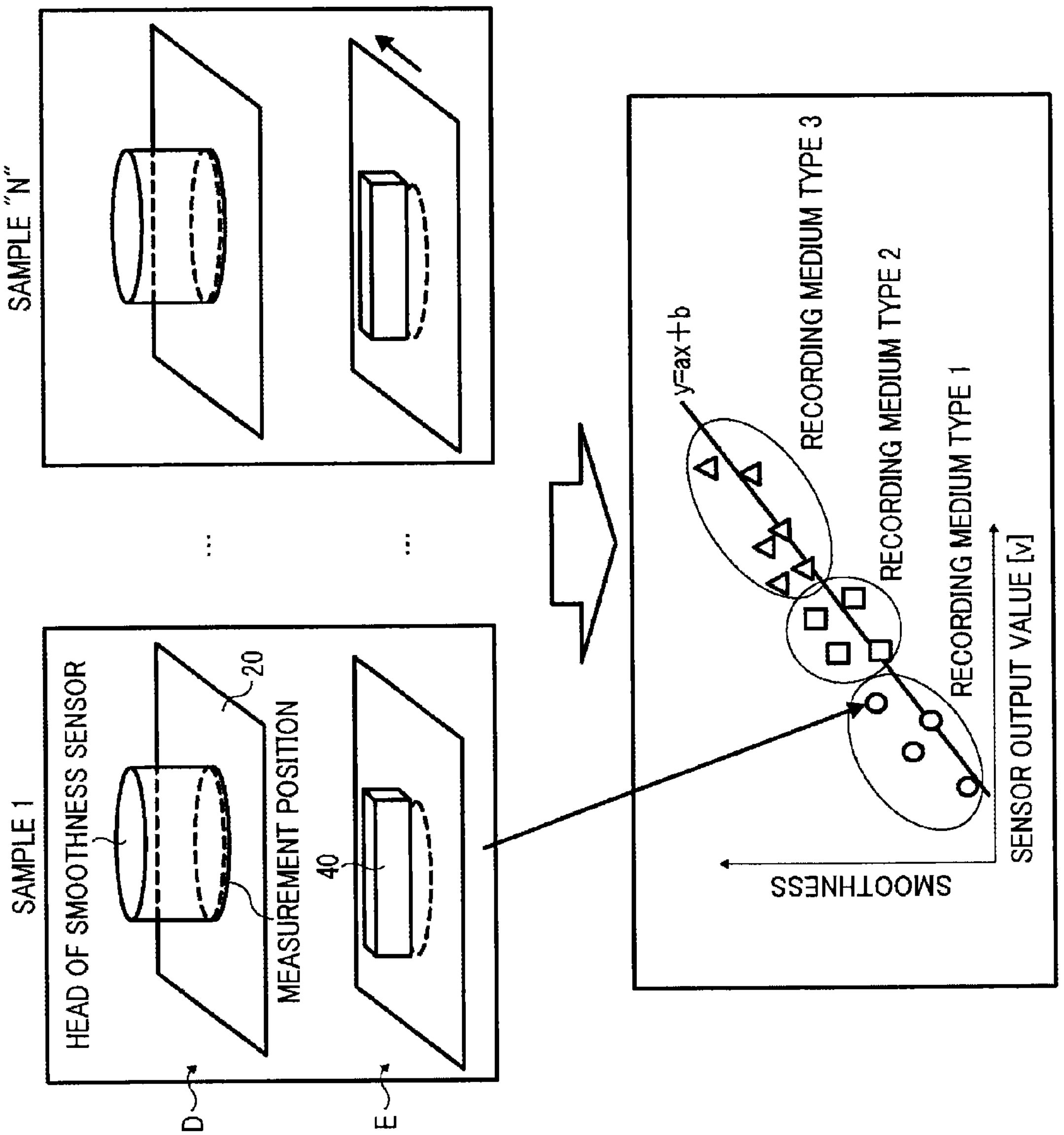
FIG. 5 is a diagram illustrating detection of recording media, with a graph of a function for calculating smoothness.

Referring now to FIG. 5, a description is given of calculation of smoothness for using the average voltage obtained by the sensor 40 for, e.g., fixing temperature control. FIG. 5 is diagram illustrating detection of recording media, with a graph of a function for calculating smoothness.

As illustrated in the graph of FIG. 5, the average voltage is converted to smoothness that can be processed more efficiently using a polynomial equation such as "y=ax+b".

Alternatively, the average voltage may be used as is with the coefficients of the polynomial equation being zero.

When the average voltage is converted to smoothness, coefficients "a" and "b" are obtained in advance by, e.g., measuring smoothness of a specific part of a recording medium 20 using a method stipulated by Japanese Industrial Standards, JISP8155 (as indicated by D in FIG. 5), and scanning the specific part of the recording medium 20 with the sensor 40 in an ideal sensor environment to measure output voltage of the sensor 40 (as indicated by E in FIG. 5). Thus, the smoothness and the sensor output value of the specific part of the recording medium 20 are obtained. The number of sample recording media is increased (as indicated by sample 1 to sample "N") to obtain data on a number of correlations between smoothness and sensor output value. A regression analysis is conducted on the data to obtain the coefficients "a" and "b" of the polynomial equation.

Figure 6:
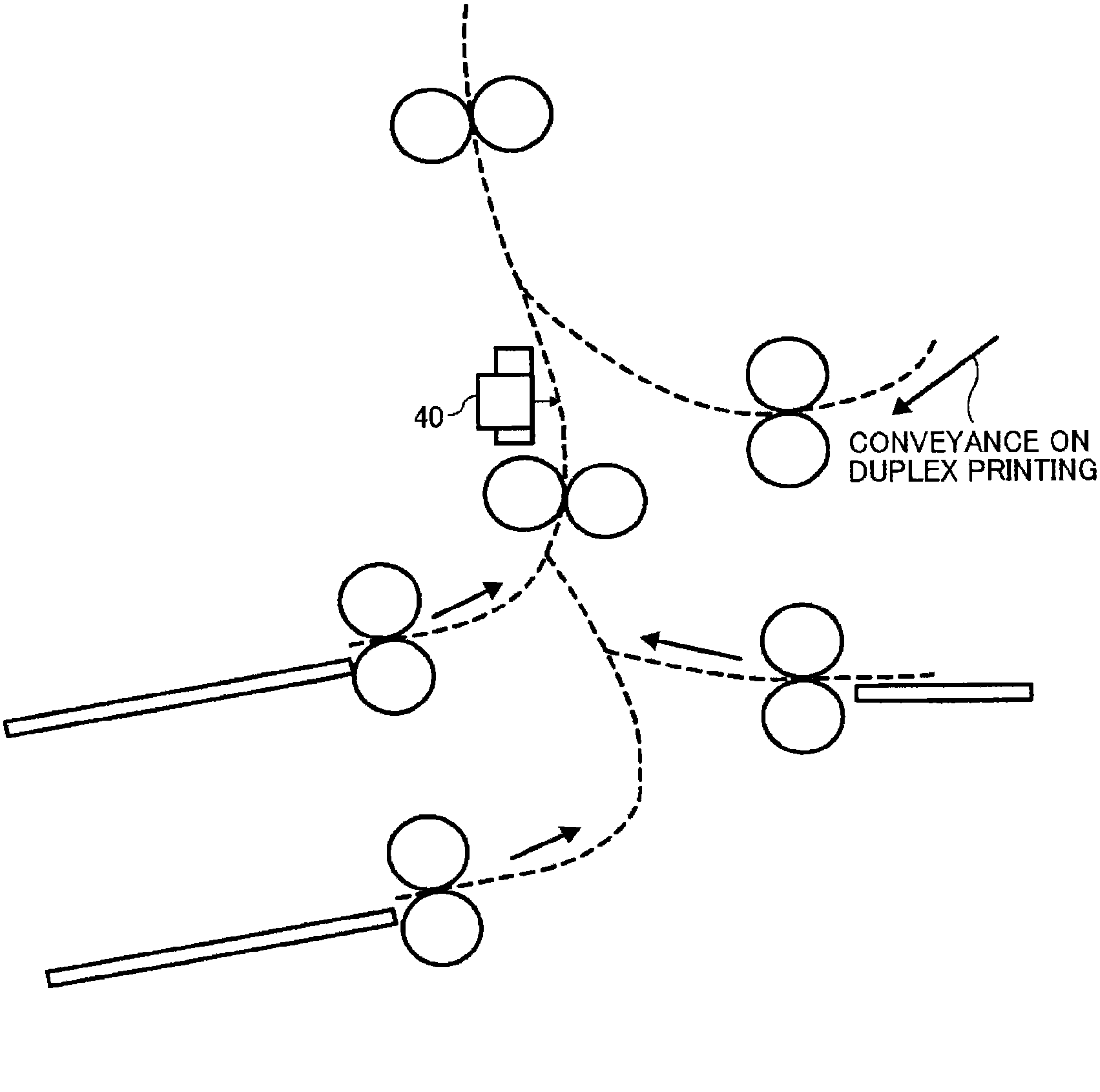
FIG. 6 is a schematic diagram illustrating an exemplary position of the sensor.

Referring now to FIG. 6, a description is given of a position of the sensor 40. FIG. 6 is a schematic diagram illustrating an exemplary position of the sensor 40.

For example, a medium-sized image forming apparatus typically used in an office has a plurality of trays, and providing a dedicated sensor for each tray is expensive. Therefore, the sensor 40 is preferably disposed to detect a recording medium 20 where a plurality of conveyance passages converge, as illustrated in FIG. 6. However, paper dust from the recording media 20 may adhere to the sensor 40 while the recording media 20 pass through the conveyance passage on which the sensor 40 is disposed, resulting in decreased output of the sensor 40.

As described above, the smoothness of a recording medium 20 is obtained using an output value of the sensor 40. Paper dust may decrease output values of the sensor 40, that is, smoothness detectability, and may make it difficult to distinguish between recording media 20. For example, if no paper dust adheres to the sensor 40, a recording medium 20 having a high smoothness (voltage: 2.9 V and smoothness: 200 seconds) can be distinguished from a recording medium 20 having a low smoothness (voltage: 2.3 V and smoothness: 20 seconds). By contrast, if paper dust adheres to the sensor 40, the recording medium 20 having a high smoothness may be detected with a voltage of 2.3 V and a smoothness of 20 seconds. As a result, the recording medium 20 having a high smoothness may be erroneously identified as a recording medium having a low smoothness.

Figure 7:
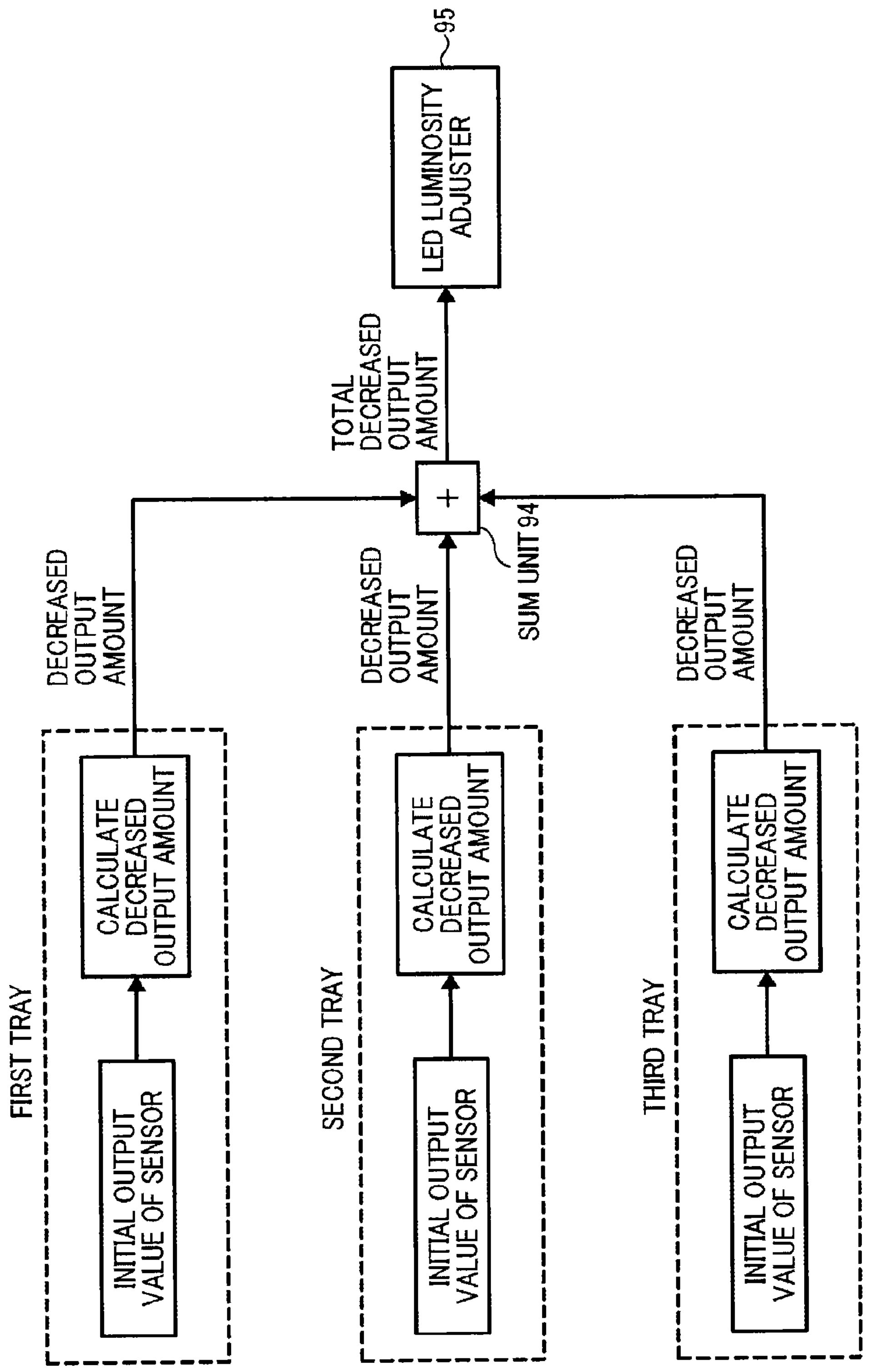
FIG. 7 is a diagram illustrating adjustment of an amount of light to be emitted by the sensor according to an embodiment of the present invention.

FIG. 7 is a diagram illustrating adjustment of an amount of light to be emitted by the light-emitting device 41, hereinafter referred to as an LED, according to an embodiment of the present invention.

FIG. 7 illustrates a case in which three trays (first through third trays) are provided. The first through third trays may include a bypass tray 36 in addition to trays 15. An initial output value of the sensor 40 for each tray is stored in memory and a decreased output amount from the initial output value is calculated for each tray. Then, a sum unit 94 sums the decreased output amount thus calculated for each tray. An LED luminosity adjuster 95 adjusts a luminosity of the LED (i.e., an amount of light to be emitted by the light source) according to the decreased output amount thus summed.

Figure 8:
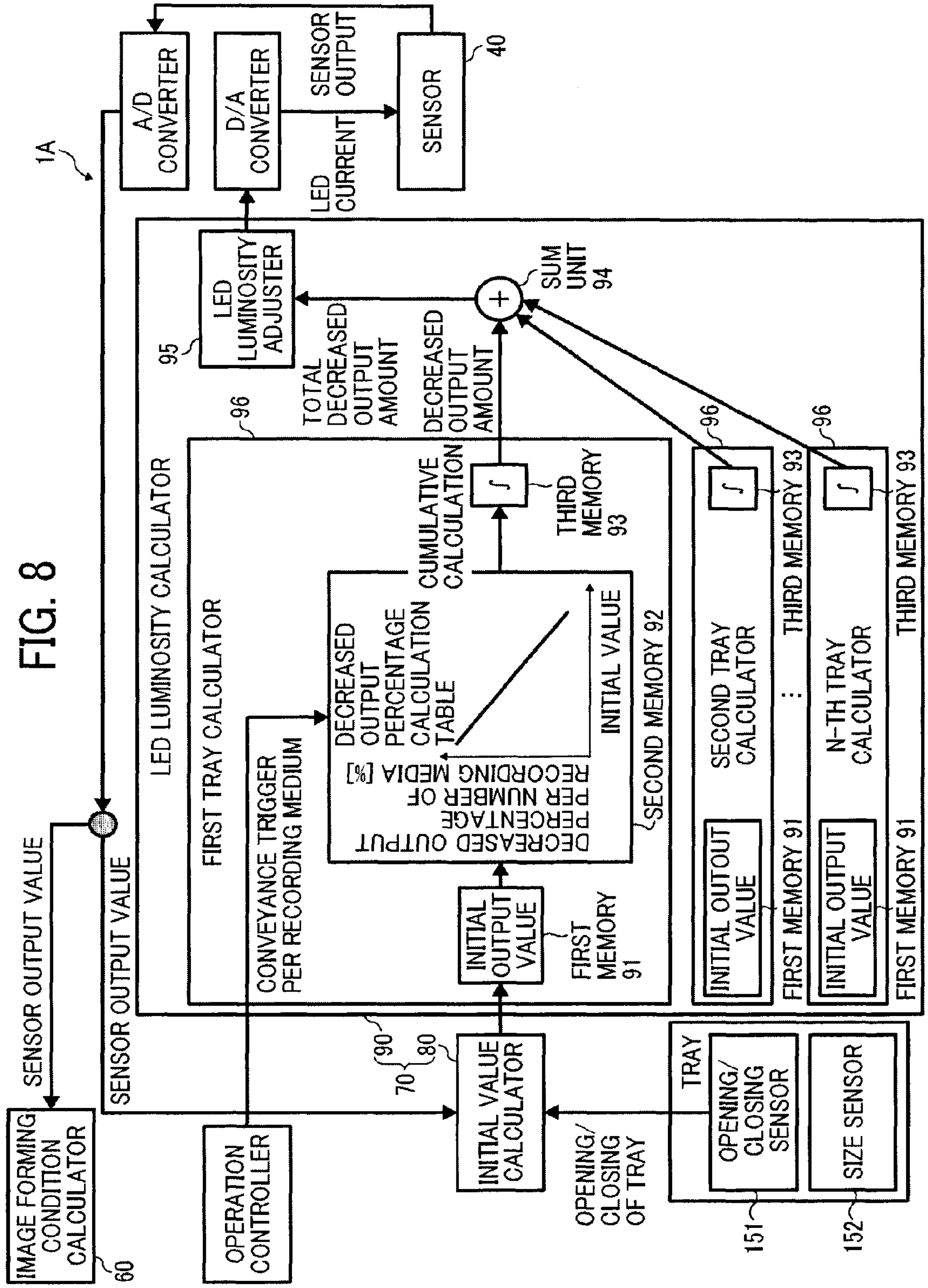
FIG. 8 is a block diagram of a recording media smoothness detector according to a first embodiment.
Figure 9:
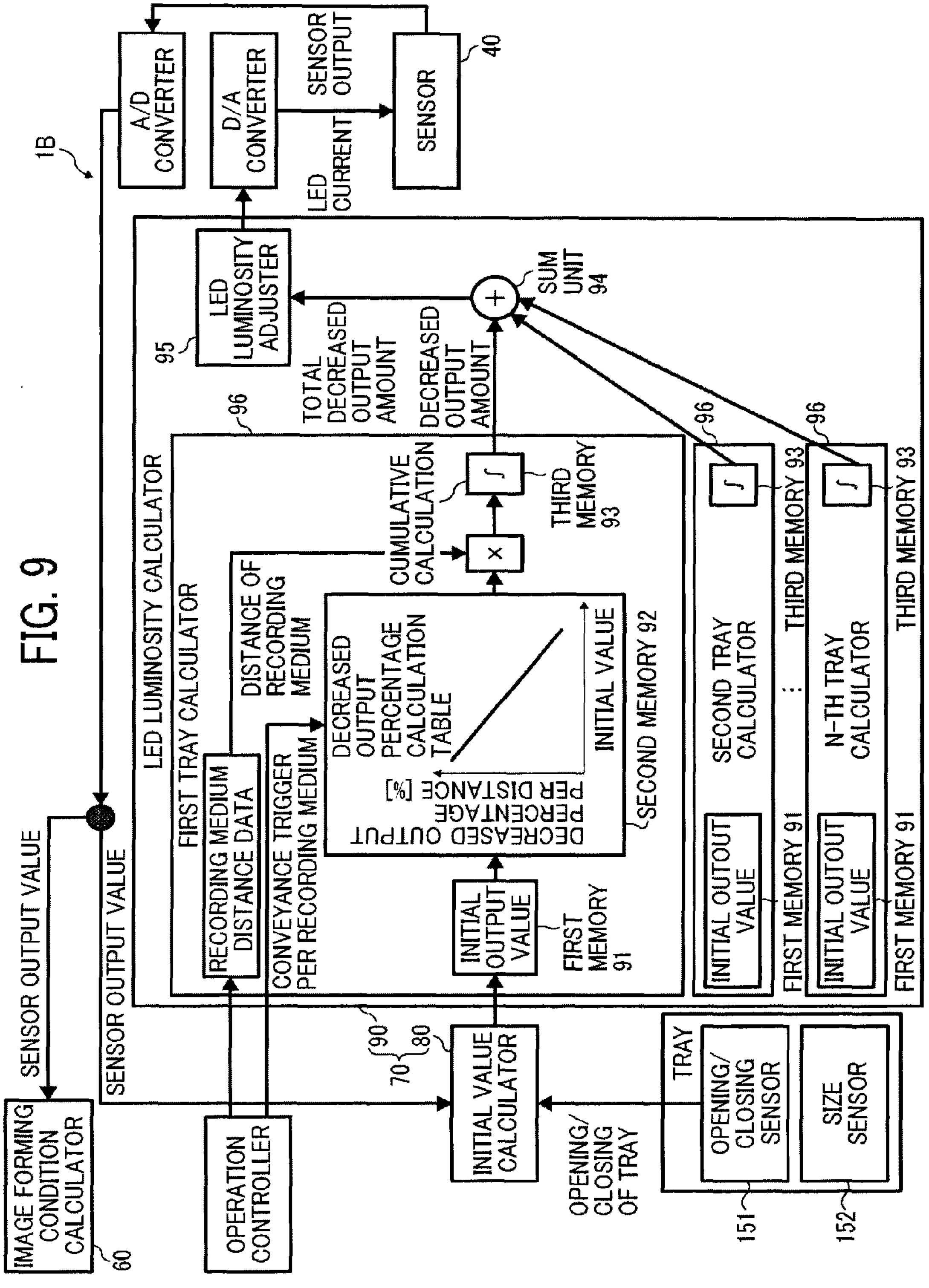
FIG. 9 is a block diagram of a recording media smoothness detector according to a second embodiment.

Referring now to FIGS. 8 and 9, a description is given of correction and update of sensor output according to embodiments of the present invention.

FIG. 8 is a block diagram of a recording media smoothness detector 1A according to a first embodiment.

As illustrated in FIG. 8, the recording media smoothness detector 1A includes a calculator 70 that includes an initial value calculator 80 and an LED luminosity calculator 90. The LED luminosity calculator 90 includes first through n tray calculators 96. Each of the tray calculators 96 includes a first memory 91, a second memory 92, and a third memory 93. The first memory 91 stores an initial output value of the sensor 40. The second memory 92 stores a table or regression equation of a decreased output percentage of the sensor 40 determined for each initial output value of the sensor 40 per number of recording media 20 conveyed. It is to be noted that the number of recording media 20 conveyed is the number of recording media 20 detected by the sensor 40 while passing through a conveyance passage on which the sensor 40 is disposed. The third memory 93 accumulates and stores a decreased output amount of the sensor 40 that is calculated based on the number of recording media 20 detected and a decreased output percentage per number of recording media 20, which is obtained using the table or regression equation stored in the second memory 92 from the initial output value stored in the first memory 91. The LED luminosity calculator 90 also includes the sum unit 94 and the LED luminosity adjuster 95. The sum unit 94 adds the decreased output amount stored in the third memory 93 to another to calculate a total decreased output amount. The LED luminosity adjuster 95 calculates an LED luminosity of the sensor 40 based on the total decreased output amount to adjust the LED luminosity at a predetermined time. The initial value calculator 80 calculates an initial output value of the sensor 40 to rewrite the initial output value stored in the first memory 91. According to the first embodiment, decreased paper dust-generated sensor output can be more accurately predicted and updated.

FIG. 9 is a block diagram of a recording media smoothness detector 1B according to a second embodiment.

As illustrated in FIG. 9, the recording media smoothness detector 1B includes a calculator 70 that includes an initial value calculator 80 and an LED luminosity calculator 90. The LED luminosity calculator 90 includes first through n tray calculators 96. Each of the tray calculators 96 includes a first memory 91, a second memory 92, and a third memory 93. The first memory 91 stores an initial output value of the sensor 40. The second memory 92 stores a table or regression equation of a decreased output percentage of the sensor 40 determined for each initial output value of the sensor 40 per distance of recording media 20 conveyed, that is, a unit length of recording media 20 that pass through the conveyance passage on which the sensor 40 is disposed. The third memory 93 accumulates and stores a decreased output amount of the sensor 40 that is calculated based on a distance of a recording medium 20 detected and a decreased output percentage per unit length of recording media 20, which is obtained using the table or regression equation stored in the second memory 92 from the initial output value stored in the first memory 91. The LED luminosity calculator 90 also includes a sum unit 94 and an LED luminosity adjuster 95. The sum unit 94 adds the decreased output amount stored in the third memory 93 to another to calculate a total decreased output amount. The LED luminosity adjuster 95 calculates an LED luminosity of the sensor 40 based on the total decreased output amount to adjust the LED luminosity at a predetermined time. The initial value calculator 80 calculates an initial output value of the sensor 40 to rewrite the initial output value stored in the first memory 91. According to the second embodiment, decreased paper dust-generated sensor output can be more accurately predicted and updated.

A description is now given of updating sensor output in an image forming process.

In the present embodiment, the initial output value is an output value of the sensor 40 at a time when the output value of the sensor 40 is not affected by paper dust. Alternatively, the initial output value is an output value of the sensor 40 to which paper dust adheres, at a time immediately after being corrected by an LED luminosity calculation. When the time has come, the initial value calculator 80 obtains a sensor output while identifying a tray from which the recording medium 20 is conveyed. The initial value calculator 80 registers the sensor output thus obtained as an initial output value in the first memory 91 of the tray thus identified. It is to be noted that the sensor 40 provides different output values depending on the smoothness of recording media 20. Accordingly, the initial output value varies depending on the type of recording media 20. If the smoothness of recording media 20 differs between the trays, the initial output value registered in the first memory differs between the trays.

The first memory 91 through the third memory 93 are provided for each tray, and identical calculation is performed for each tray. When the image forming apparatus 1000 identifies changes of the trays, the tray subjected to the calculation is also changed.

The sum unit 94 sums the values stored in the third memories 93 as a total decreased output amount. In other words, the values accumulated in the third memories 93 indicate contribution of the trays to the decreased output percentage of the sensor 40. Specifically, for example, the first tray accommodates recording media 20 that easily generate paper dust whereas the second tray accommodates recording media 20 that hardly generate paper dust. When the same number of recording media 20 are conveyed from the first and second trays, passing before the sensor 40, the first tray has a greater contribution to contamination of the sensor 40 than the second tray. When the recording media 20 are conveyed as described above, the total decreased output amount is calculated by the sum unit 94 and an output value of the sensor 40 affected by paper dust is predicted from the total decreased output amount. Based on the total decreased output amount, the LED luminosity adjuster 95 calculates and adjusts an LED current to obtain an output value of the sensor 40 that is not affected by an accumulation of paper dust on the sensor 40.

A description is now given of an operation when the type of recording media 20 may be changed.

If a tray (e.g., first tray) accommodates a different type of recording media 20 from the previous one, the recording media 20 may have different smoothness from the smoothness of recording media 20 previously placed on the tray. In addition, the decreased paper dust-generated output percentage with respect to the number of recording media 20 may change. Accordingly, the initial output value is measured again for the recording media 20 currently placed on the tray. To ensure correction of sensor output for the re-measurement, firstly, the LED luminosity adjuster 95 calculates and updates an LED current. The change of recording media 20 placed on the tray is identified by opening/closing of the tray.

Data used for detecting the opening/closing of each tray include, e.g., readings of an opening/closing sensor 151 generally incorporated in image forming apparatuses, when the software of the image forming apparatuses is activated. On the other hand, when the software of the image forming apparatuses is not activated because, e.g., the power is turned off or the image forming apparatuses are in energy saving mode, the opening/closing of each tray is identified by the position of a bottom board of each tray because the position of the bottom board moves when the tray is opened or closed. Accordingly, upon the next activation of software, the position of the bottom board is identified by a blocked/unblocked state of an upper-limit sensor, to detect the opening/closing of each tray.

By repeating the above-described operation, the sensor output is corrected by increasing the luminosity even if the sensor 40 provides a decreased paper dust-generated output.

An image forming condition calculator 60 uses such corrected sensor output to constantly set appropriate image forming conditions including a fixing temperature.

Figure 10A:
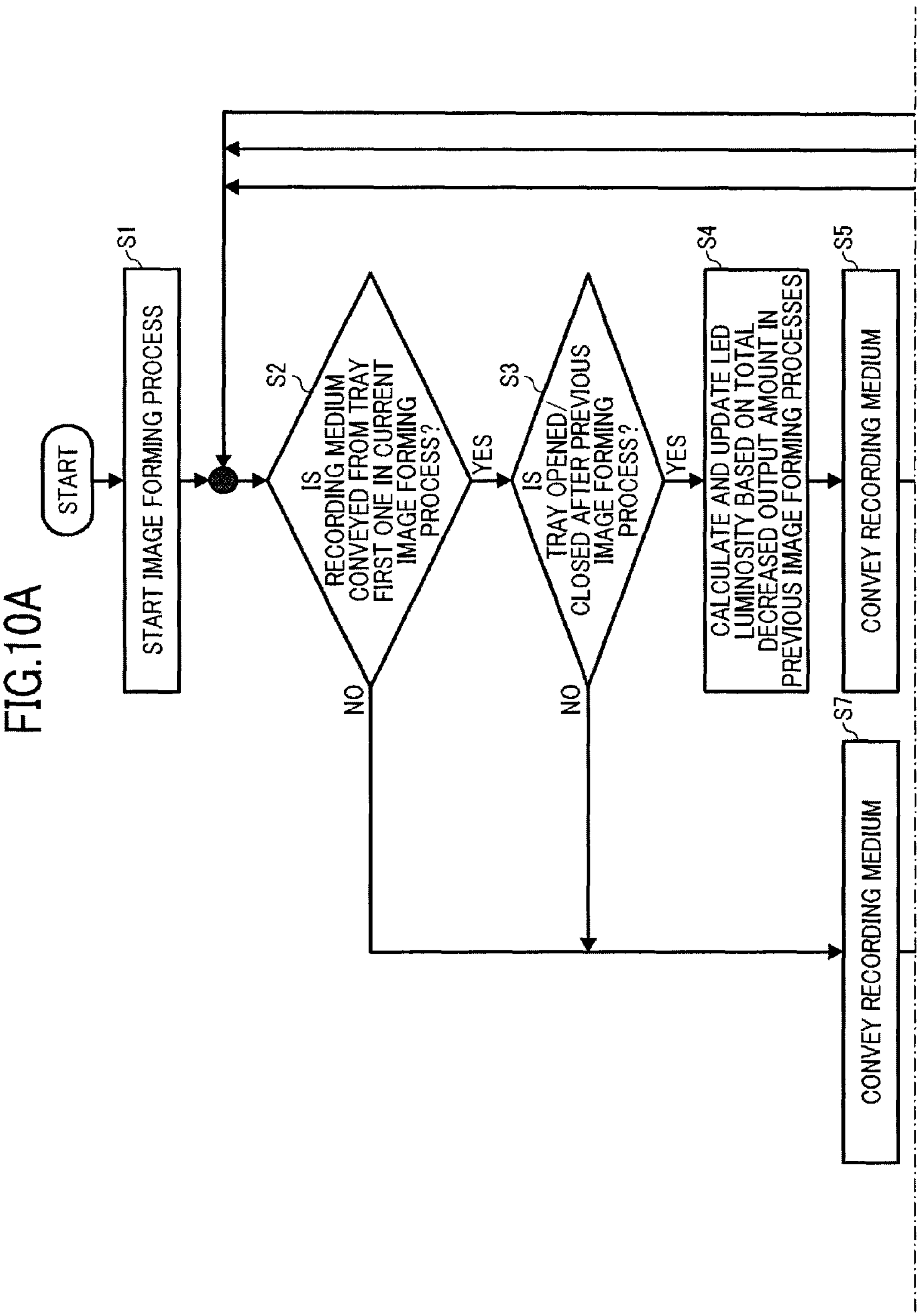
FIG. 10A is a flowchart of a process of updating sensor output.
Figure 10B:
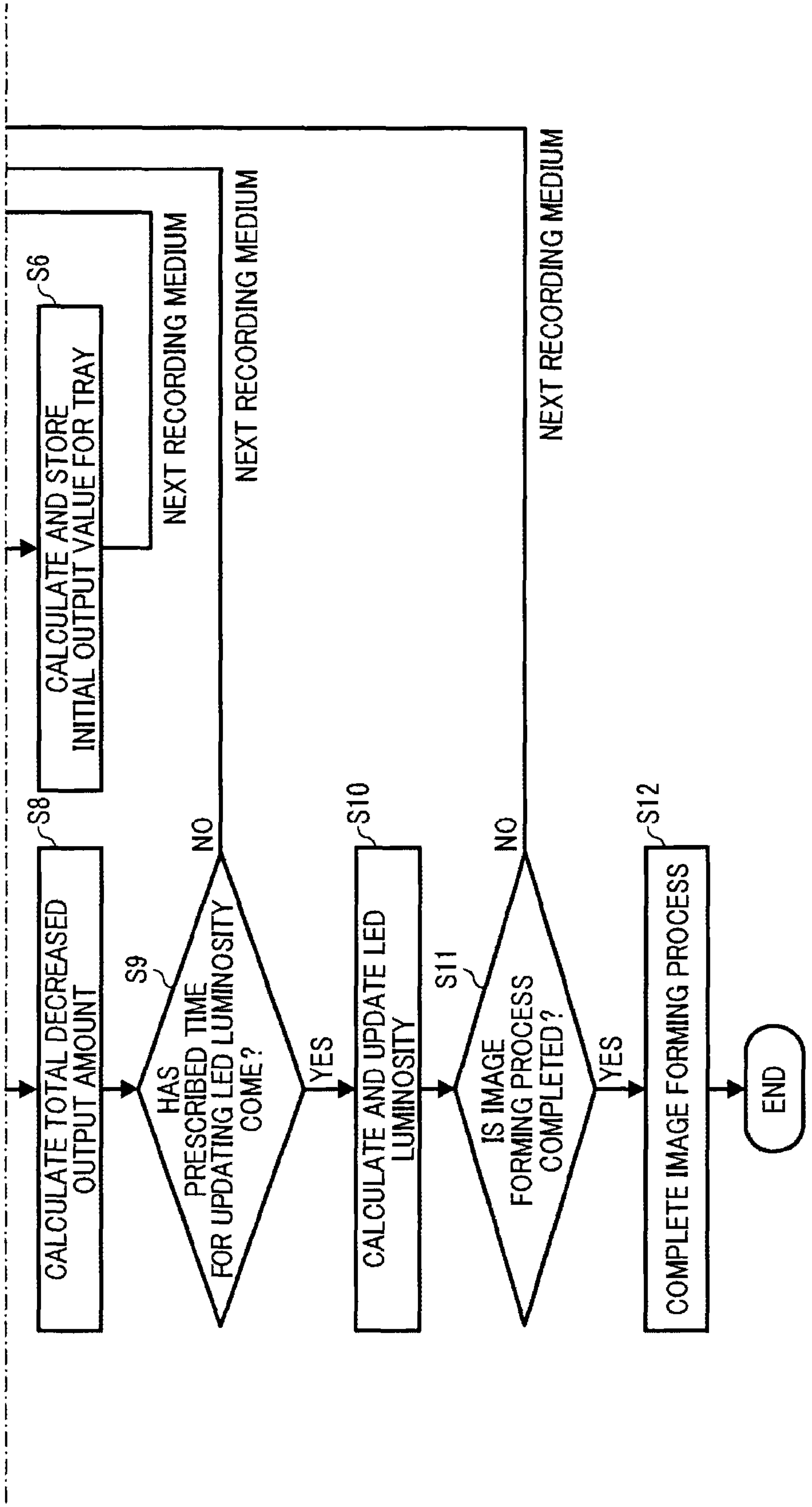
FIG. 10B is a continuation of the flowchart of a process of updating sensor output in FIG. 10A.

Referring now to FIGS. 10A and 10B, a description is given of a process of updating output of the sensor 40. FIG. 10A is a flowchart of the process of updating the sensor output. FIG. 10B is a continuation of the flowchart of the process of updating the sensor output in FIG. 10A.

In step S1, an image forming process is started. In step S2, it is determined whether the recording medium 20 conveyed from the tray is the first one in the current image forming process. If so (Yes in step S2), in step S3, it is determined whether the tray is opened/closed after the previous image forming process. If so (Yes in step S3), in step S4, it is determined that new recording media 20 are placed on the tray, and therefore, the LED luminosity adjuster 95 adjusts an LED luminosity based on the total decreased output amount in the previous image forming processes. In step S5, a recording medium 20 is conveyed. In step S6, the initial value calculator 80 calculates an initial output value for the tray, to store the calculated initial output value in the first memory 91. Then, the process returns to step S2 for the next recording medium 20.

On the other hand, if it is determined that the recording medium 20 is not the first one in the current image forming process (No in step S2), or if it is determined that the tray is not opened or closed after the previous image forming process (No in step S3), then, the LED luminosity is not adjusted and a recording medium 20 is conveyed in step S7. In step S8, from the decreased output percentage per recording medium 20, decreased output amounts are accumulated and summed by the sum unit 94 to obtain a total decreased output amount. In short, when an image forming process is started, the image forming apparatus 1000 identifies a tray from which a recording medium 20 subjected to the image forming process is conveyed, and causes a tray calculator 96 corresponding to the tray thus identified to calculate a decreased output percentage per recording medium 20 as a conveyance trigger. With the conveyance trigger, according to the first embodiment, a decreased output percentage per number of recording media 20 is obtained from the initial output value and the decreased output percentage calculation table for the tray. On the other hand, according to the second embodiment, a decreased output percentage per unit length of recording medium 20 is obtained from the initial output value and the decreased output percentage calculation table for the tray. In the second embodiment, the decreased output percentage per unit length of recording media 20 is multiplied by a length of a recording medium 20 in the direction in which the recording medium 20 is conveyed from the tray, thereby obtaining a decreased output percentage for each recording medium 20 conveyed. The length of the recording medium 20 is obtained by an automatic size detecting function typically used in image forming apparatuses. For example, readings of a size sensor 152 provided for each tray are used.

In step S9, it is determined whether a prescribed time for updating the LED luminosity has come. As described above, based on the total decreased output amount, the LED luminosity adjuster 95 calculates and adjusts an LED current to obtain an output value of the sensor 40 that is not affected by an accumulation of paper dust on the sensor 40. Ideally, the LED luminosity is calculated and adjusted per recording medium 20. However, the decreased output percentage per recording medium 20 is extremely small, specifically, at most about 0.3% for each thousand sheets of recording media 20 conveyed. Therefore, in actuality, the LED luminosity is calculated and adjusted after an image forming process is performed for a predetermined number of recording media 20, taking into account the computation load of a central processing unit (CPU) of the image forming apparatus. Accordingly, in the present embodiment, the total decreased output amount is compared with a predetermined threshold. The prescribed time for updating the LED luminosity is when the total decreased output amount exceeds the threshold.

If it is determined that the prescribed time for updating the LED luminosity has come (Yes in step S9), the LED luminosity is adjusted in step S10. In step S11, it is determined whether the image forming process is completed. If so (Yes in step S11), the image forming process ends in step S12. By contrast, if it is determined that the prescribed time for updating the LED luminosity has not come (No in step S9), or if it is determined that the image forming process is not completed (No in step S11), then, the process returns to step S2 for the next recording medium 20.

By repeating the above-described operation, the sensor output is corrected by increasing the luminosity even if the sensor 40 provides a decreased paper dust-generated output.

The image forming condition calculator 60 uses such corrected sensor output to constantly set appropriate image forming conditions, including a fixing temperature.

A description is now given of creating a decreased output percentage calculation table that is stored in the second memory 92. The table is created off-line in advance.

A sensor that is not affected by paper dust is disposed in an image forming apparatus. In other words, the sensor does not provide a paper dust-generated decreased output value. Recording media are conveyed for measurement of sensor outputs. After completing the measurement for one type of recording media, the sensor is cleaned up so that the sensor does not provide a decreased output value. Next, another type of recording media are conveyed for measurement of sensor outputs. The above-described operation is performed for recording media having different smoothness degrees to obtain a relation between the number of printouts and absolute sensor output value.

Figure 11:
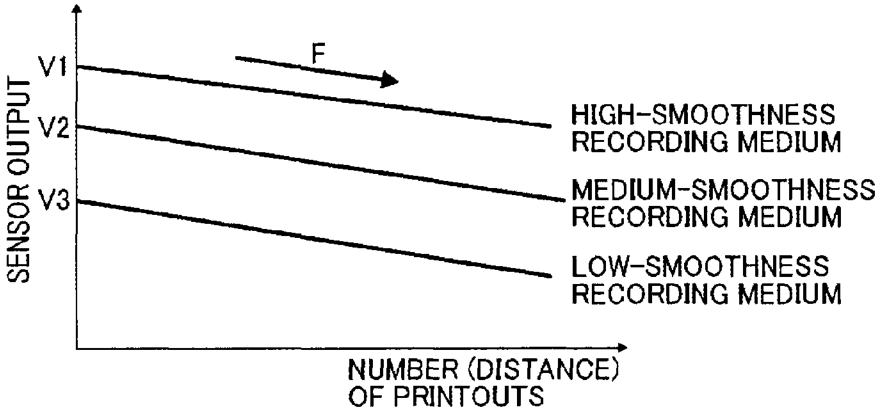
FIG. 11 is a graph illustrating a relation between sensor output and the number of printouts.

FIG. 11 is a graph illustrating a relation between sensor output and the number of printouts. The absolute sensor output value depends on the reflection rate (i.e., smoothness) of the recording media. Since differences in decreased paper dust-generated output percentages due to the smoothness of the recording media cannot be evaluated, the sensor output is normalized to 100 when the number of printouts is zero. It is to be noted that, in FIG. 11, an arrow F indicates that the sensor outputs decrease due to paper dust.

Figure 12:
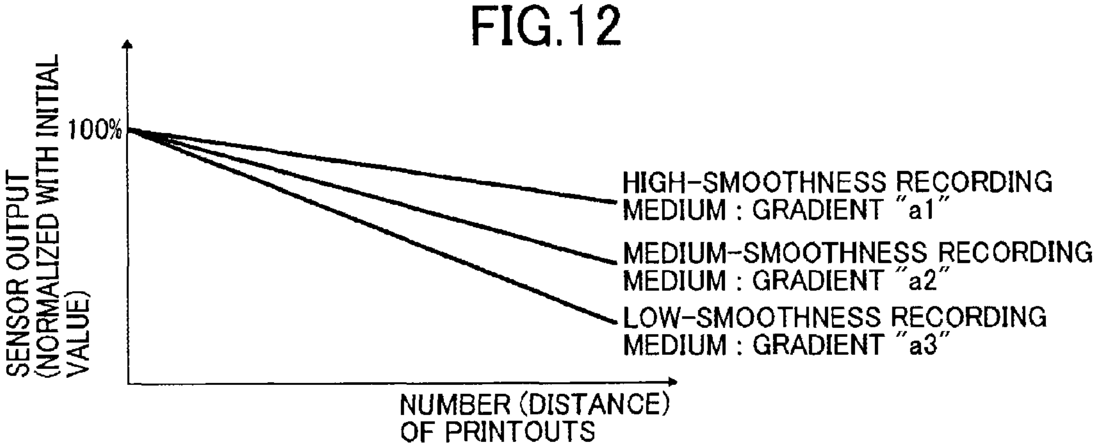
FIG. 12 is a graph illustrating a relation between normalized sensor output and the number of printouts.

FIG. 12 is a graph illustrating a relation between normalized sensor output and the number of printouts. As illustrated in FIG. 12, the recording media having the lowest smoothness shows the greatest decreased output percentage per recording medium. When adhering to the sensor, paper dust coats a lens of the sensor and decreases the amount of light passing through the lens. The recording media having a relatively low smoothness generate a relatively large amount of paper dust. Accordingly, the paper dust coats the lens of the sensor in large amounts, thereby decreasing the amount of light passing through the lens and thus adversely affecting sensor precision.

Since the decreased output percentage depends on the smoothness of recording media, it can be expressed as a gradient of the decrease. For example, FIG. 12 illustrates a regression equation of "Y=100×R^Number of recording media", where R represents a rate of decrease with respect to the number of recording media. The rate of decrease depends on the recording media, in a range of about 0.9985±0.001. To use the relation for an update, gradients of the decreased percentage of the normalized sensor output are obtained with respect to a plurality of recording media.

Figure 13:
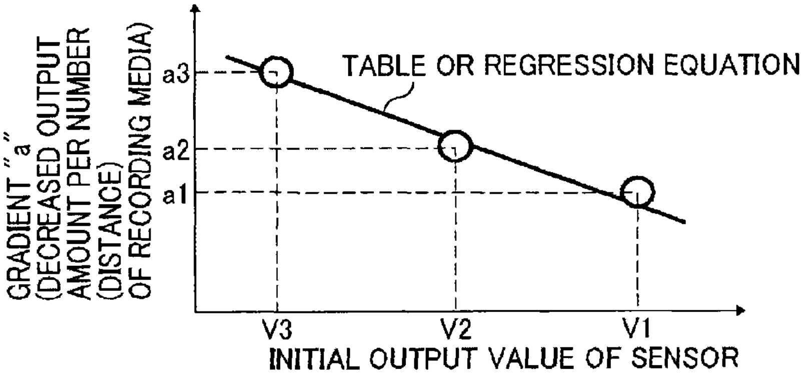
FIG. 13 is a graph of a table or regression equation, illustrating a relation between inclination of decreased output percentage and initial sensor output.

FIG. 13 is a graph of a table or regression equation, illustrating a relation between gradients of decreased output percentage and initial sensor output. Specifically, the horizontal axis indicates absolute sensor output values when the number of printouts is zero. The vertical axis indicates the inclination. From the data, a regression equation or a look-up table is created as a decreased output percentage calculation table with respect to initial output values. For example, an equation of "R=A×sensor output when the number of printouts is zero+B" may be stored as a look-up table.

If an image forming apparatus in use has conveyance conditions widely differing between trays, generating different amounts of paper dust, a table or regression equation may be created and stored for each tray.

A description is now given of calculation performed by the LED luminosity adjuster 95.

The amount of light to be emitted by the LED is obtained from the decreased output amount, using the table or regression equation as illustrated in FIG. 13. The table or regression equation is created off-line in advance.

Firstly, absolute sensor output values are obtained with different LED currents, by changing the amount of paper dust adhering to a sensor. From the absolute sensor output values thus obtained, a decreased output percentage from a sensor output provided when no paper dust adheres to the sensor is obtained. In addition, an LED current (a2, a3 . . . ) to correct the decreased sensor output to the sensor output provided when no paper dust adheres to the sensor is obtained.

Figure 14:
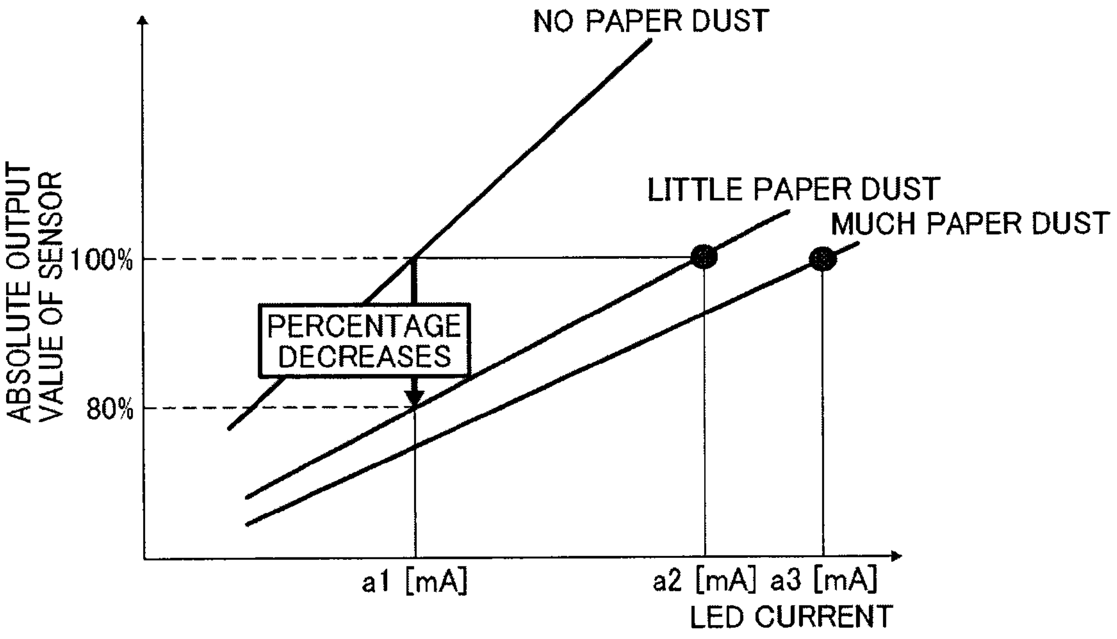
FIG. 14 is a graph illustrating a relation between absolute sensor output and LED current.

Thus, a graph illustrated in FIG. 14 is created. FIG. 14 shows a relation between absolute output value of the sensor and LED current.

A regression equation of, e.g., "LED current=a1+A× decreased output percentage" may be created from the graph.

Figure 15:
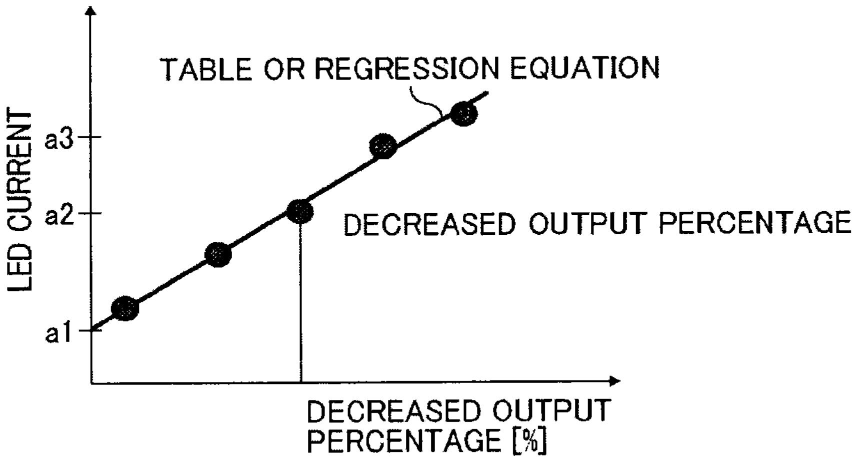
FIG. 15 is a graph of a table or regression equation, illustrating a relation between LED current and decreased output percentage.

FIG. 15 is a graph of such a regression equation. The LED luminosity adjuster 95 calculates and determines an LED current based on the total decreased output amount, using the regression equation or a table of the regression equation.

Figure 16:
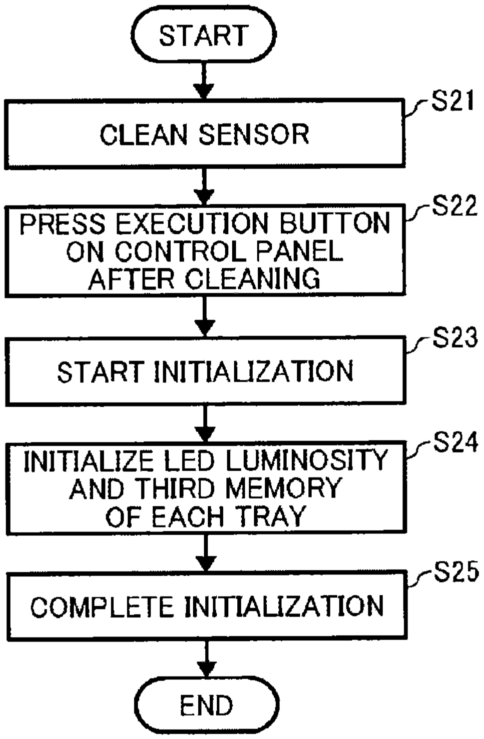
FIG. 16 is a flowchart of a sensor maintenance process.

Referring now to FIG. 16, a description is given of a sensor maintenance process. FIG. 16 is a flowchart of the sensor maintenance process.

Usually, maintenance of image forming apparatuses, such as replacement of deteriorating parts and cleaning of sensors, is performed periodically. In step S21, the sensor 40 is cleaned. For example, paper dust is removed from the sensor 40. By cleaning the sensor 40, the total decreased output amount used to predict a sensor output value by the above-described calculation becomes zero. Accordingly, the predicted sensor output value is also reset.

In the present embodiment, a cumulative value reset button (or execution button) is provided on a control panel 400 of the image forming apparatus 1000. After the cleaning of the sensor 40 is completed, the execution button is pressed in step S22. In step S23, initialization starts. In step S24, the values accumulated in the third memories 93 and the LED luminosity are reset to their respective initial values. In step S25, the initialization is completed.

Figure 17:
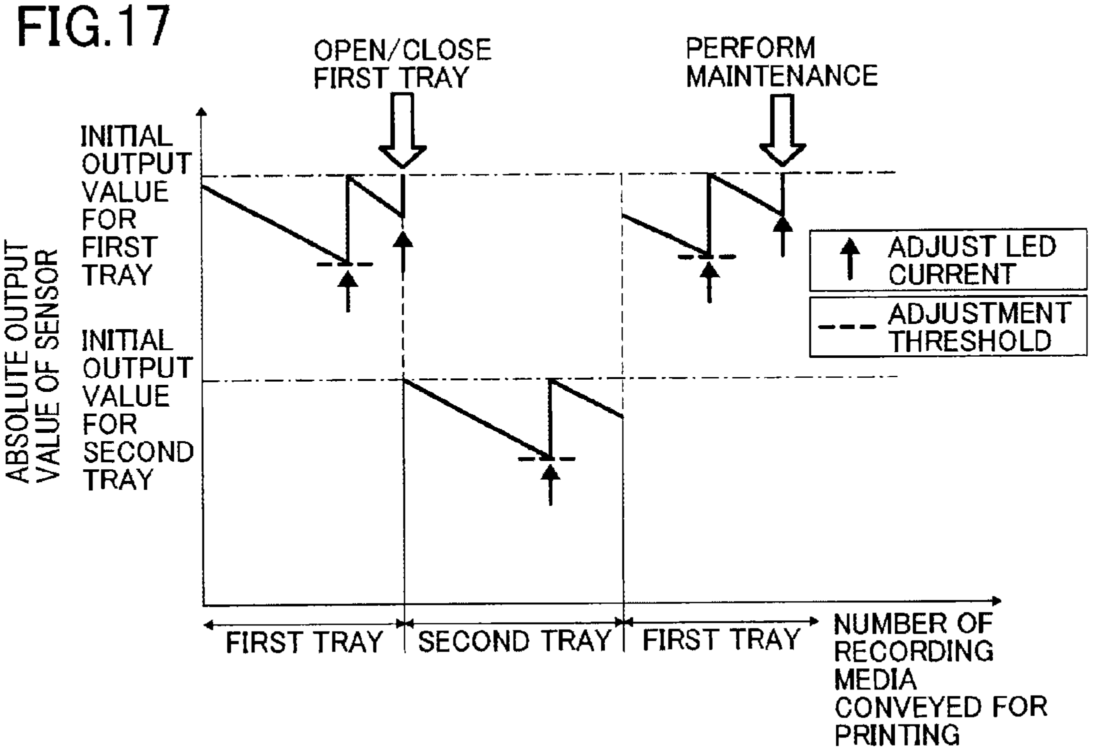
FIG. 17 is a diagram illustrating an example of sensor output in the sensor maintenance process.

FIG. 17 is a diagram illustrating an example of sensor output in the sensor maintenance process. In this example, the LED current is updated when the decreased output percentage for each tray does not reach a predetermined threshold.

As described above, according to at least one embodiment of the present invention, a decreased paper dust-generated output amount of a smoothness sensor is accurately predicted to adjust a luminosity of the smoothness sensor without additional production costs, to appropriately detect the output of the smoothness sensor.

Numerous additional modifications and variations are possible in light of the above teachings. It is therefore to be understood that within the scope of the appended claims, the present invention may be practiced otherwise than as specifically described herein.

With some embodiments of the present invention having thus been described, it will be obvious that the same may be varied in many ways. Such variations are not to be regarded as a departure from the scope of the present invention, and all such modifications are intended to be included within the scope of the present invention.

For example, elements and/or features of different illustrative embodiments may be combined with each other and/or substituted for each other within the scope of the present invention and appended claims.

Further, any of the above-described devices or units can be implemented as a hardware apparatus, such as a special-purpose circuit or device, or as a hardware/software combination, such as a processor executing a software program.

What is claimed is:

1. A recording media smoothness detector comprising:

a sensor, including a light source to emit light toward a recording medium, and a light detector to detect an amount of light reflected by the recording medium; and a calculator, including a first memory to store an initial output value of the sensor, and a second memory to store a decreased output percentage of the sensor relative to the initial output value per number of recording media detected, the calculator being configured to calculate a decreased output amount of the sensor from the decreased output percentage of the sensor per number of recording media detected, according to a number of recording media detected by the sensor, adjust a luminosity of the light source based on the calculated decreased output amount of the sensor, and determine a type of the recording medium based on an output of the sensor after the adjustment of the luminosity of the light source and based on the number of recording media detected by the sensor.

2. The recording media smoothness detector according to claim 1, wherein the second memory stores a table or regression equation of the decreased output percentage of the sensor relative to the initial output value per number of recording media detected, and wherein the calculator further includes a third memory to accumulate and store the decreased output amount of the sensor calculated, according to the number of recording media detected by the sensor, from the decreased output percentage of the sensor per number of recording media detected, which is obtained using the table or regression equation stored in the second memory from the initial output value stored in the first memory.

3. The recording media smoothness detector according to claim 1, wherein the calculator further includes a third memory to accumulate and store the decreased output amount of the sensor calculated, according to the number of recording media detected by the sensor, from the decreased output percentage of the sensor per number of recording media detected, which is obtained using a table or regression equation stored in the second memory from the initial output value stored in the first memory.

4. An image forming apparatus comprising:

a sheet feeder to feed a recording medium;

a conveyance passage through which the recording medium is conveyed from the sheet feeder; and the recording media smoothness detector according to claim 1 disposed on the conveyance passage.

5. The image forming apparatus according to claim 4, wherein the sheet feeder includes one or more trays for each of which the first memory, the second memory, and a third memory are provided, and wherein the calculator is further configured to add the decreased output amount of the sensor stored in the third memory to another decreased output amount from one of the one or more trays to calculate a total decreased output amount of the sensor, and calculate and adjust the luminosity of the light source based on the total decreased output amount of the sensor.

6. The image forming apparatus according to claim 5, wherein the calculator is further configured to update the luminosity of the light source in response to the decreased output amount of the sensor accumulated and stored in the third memory or the calculated total decreased output amount of the sensor exceeding a predetermined threshold.

7. The image forming apparatus according to claim 5, wherein the calculator further includes an initial value calculator to calculate an initial output value of the sensor, and wherein the calculator is further configured to update the luminosity of the light source and the initial value calculator measures an initial output value of the sensor with respect to a recording medium placed on a tray in response to conveyance of the recording medium from the tray after opening or closing of the tray, to update a value stored in the second memory provided for the tray.

8. The image forming apparatus according to claim 5, wherein the calculator is further configured to adjust the luminosity of the light source using a table or regression equation of current of the light source relative to the decreased output percentage of the sensor prepared in advance.

9. The image forming apparatus according to claim 5, further comprising a control panel to receive instructions of resetting the decreased output amount of the sensor accumulated and stored in the third memory provided for each of the one or more trays to zero and initializing the luminosity of the light source calculated and adjusted by the calculator.

10. A recording media smoothness detector comprising:

a sensor, including a light source to emit light toward a recording medium, and a light detector to detect an amount of light reflected by the recording medium; and a calculator, including a first memory to store an initial output value of the sensor, and a second memory to store a decreased output percentage of the sensor relative to the initial output value per unit length of recording media, the calculator being configured to calculate a decreased output amount of the sensor from the decreased output percentage of the sensor per unit length of recording media, according to a unit length of recording media detected by the sensor, adjust a luminosity of the light source based on the calculated decreased output amount of the sensor, and determine a type of the recording medium based on an output of the sensor after the adjustment of the luminosity of the light source and based on the number of recording media detected by the sensor.

11. The recording media smoothness detector according to claim 10, wherein the second memory stores a table or regression equation of the decreased output percentage of the sensor relative to the initial output value per unit length of recording media, and wherein the calculator further includes a third memory to accumulate and store the decreased output amount of the sensor calculated, according to the unit length of recording media detected by the sensor, from the decreased output percentage of the sensor per unit length of recording media, which is obtained using the table or regression equation stored in the second memory from the initial output value stored in the first memory.

12. An image forming apparatus comprising:

a sheet feeder to feed a recording medium;

a conveyance passage through which the recording medium is conveyed from the sheet feeder; and the recording media smoothness detector according to claim 10 disposed on the conveyance passage.

13. The image forming apparatus according to claim 12, wherein the sheet feeder includes one or more trays for each of which the first memory, the second memory, and a third memory are provided, and wherein the calculator is further configured to add the decreased output amount of the sensor stored in the third memory to another decreased output amount from one of the one or more trays to calculate a total decreased output amount of the sensor, and calculate and adjust the luminosity of the light source based on the total decreased output amount of the sensor.

14. The image forming apparatus according to claim 13, wherein the calculator is further configured to update the luminosity of the light source in response to the decreased output amount of the sensor accumulated and stored in the third memory or the calculated total decreased output amount of the sensor exceeding a predetermined threshold.

15. The image forming apparatus according to claim 13, wherein the calculator further includes an initial value calculator to calculate an initial output value of the sensor, and wherein the calculator is further configured to update the luminosity of the light source and the initial value calculator measures an initial output value of the sensor with respect to a recording medium placed on a tray in response to conveyance of the recording medium from the tray after opening or closing of the tray, to update a value stored in the second memory provided for the tray.

16. The image forming apparatus according to claim 13, wherein the calculator is further configured to adjust the luminosity of the light source using a table or regression equation of current of the light source relative to the decreased output percentage of the sensor prepared in advance.

17. The image forming apparatus according to claim 13, further comprising a control panel to receive instructions of resetting the decreased output amount of the sensor accumulated and stored in the third memory provided for each of the one or more trays to zero and initializing the luminosity of the light source calculated and adjusted by the calculator.

* * * * *